(12) United States Patent
Sorell et al.

(10) Patent No.: US 10,328,599 B2
(45) Date of Patent: Jun. 25, 2019

(54) METHOD AND GUIDE BAR CLAMPING ARRANGEMENT RELATED TO A MOTOR SAW

(71) Applicant: JPS TEKNIK AD, Farilla (SE)

(72) Inventors: John Peter Sorell, Farila (SE); Kurt Gunnar Falk, Hudiksuall (SE)

(73) Assignee: JPS TEKNIK AB, Farila (SE)

( * ) Notice: Subject to any disclaimer, the term of this patent is extended or adjusted under 35 U.S.C. 154(b) by 444 days.

(21) Appl. No.: 14/398,540

(22) PCT Filed: May 3, 2013

(86) PCT No.: PCT/SE2013/000061
§ 371 (c)(1),
(2) Date: Nov. 3, 2014

(87) PCT Pub. No.: WO2013/165294
PCT Pub. Date: Nov. 7, 2013

(65) Prior Publication Data
US 2015/0089820 A1    Apr. 2, 2015

(30) Foreign Application Priority Data

May 3, 2012  (SE) ...................................... 1200261

(51) Int. Cl.
*B27B 17/02*        (2006.01)
*A01G 23/091*       (2006.01)

(52) U.S. Cl.
CPC ............ *B27B 17/02* (2013.01); *A01G 23/091* (2013.01)

(58) Field of Classification Search
CPC ..... B27B 17/00; B27B 17/0016; B27B 17/02; B27B 17/025; B27B 17/04
(Continued)

(56) References Cited

U.S. PATENT DOCUMENTS

| | | | |
|---|---|---|---|
| 2,888,964 A * | 6/1959 | Mall ....................... | B27B 17/02 30/384 |
| 3,870,125 A * | 3/1975 | Gorski .................... | B27B 17/02 123/196 CP |

(Continued)

FOREIGN PATENT DOCUMENTS

| | | |
|---|---|---|
| DE | 19737886 | 12/1998 |
| EP | 0 205 620 | 12/1986 |

(Continued)

OTHER PUBLICATIONS

International Search Report dated Aug. 15, 2013, corresponding to PCT/SE2013/000061.

(Continued)

*Primary Examiner* — Jason Daniel Prone
*Assistant Examiner* — Richard D Crosby, Jr.
(74) *Attorney, Agent, or Firm* — Young & Thompson (57) ABSTRACT

Method and an arrangement within a motor saw, having a guide bar, a drive motor unit including with its chassis a drive motor, whose rotatable shaft supports a drive disc, around which a portion of an endless saw chain runs, the saw chain also being adapted with its remaining portions to run along and form the guide bar arrangement with its guide bar and along tracks allotted to side edges directed away from each other. An anchored support plate, a displaceable clamping plate and with an interrelated arrangement in an inactivated position, the end area of the guide bar within a first mode displaces the end area in a direction perpendicular from the plane and from the support plate, and within a second mode displacing the end area and its guide bar in a direction along the plane allotted to the guide bar and out of the inactivated interrelated arrangement.

16 Claims, 4 Drawing Sheets

(58) Field of Classification Search
USPC .............................. 30/381–387; 83/788–820
See application file for complete search history.

(56) References Cited

U.S. PATENT DOCUMENTS

| | | | | |
|---|---|---|---|---|
| 3,967,378 A * | 7/1976 | Arff | ........................ | B27B 17/02 30/383 |
| 4,223,438 A * | 9/1980 | Kerrison | ................. | B27B 17/12 30/123.4 |
| 4,259,783 A * | 4/1981 | Scott-Jackson | ....... | B27B 17/025 30/384 |
| 4,807,366 A * | 2/1989 | Masato | ............... | B27B 17/0008 30/381 |
| 4,813,135 A * | 3/1989 | Kuwica | ................... | B27B 17/04 30/384 |
| 4,819,332 A * | 4/1989 | Sugihara | ................ | B27B 17/12 30/123.4 |
| 4,999,918 A * | 3/1991 | Schliemann | ............ | B27B 17/14 30/383 |
| 5,093,998 A * | 3/1992 | Seigneur | .............. | A01G 23/091 30/383 |
| 5,098,348 A * | 3/1992 | O'Neel | ..................... | F16H 7/06 30/381 |
| 5,179,785 A * | 1/1993 | Nagashima | ............. | B27B 17/04 30/381 |
| 5,249,362 A | 10/1993 | Harding | | |
| 5,353,506 A * | 10/1994 | Muller | .................... | B27B 17/02 30/383 |
| 5,522,143 A * | 6/1996 | Schliemann | ............ | B27B 17/14 30/383 |
| 5,709,254 A * | 1/1998 | Argue | .................. | A01G 23/091 144/336 |
| 5,896,670 A * | 4/1999 | Gibson | ................... | B27B 17/14 30/386 |
| 5,987,786 A * | 11/1999 | Gibson | ................ | A01G 23/091 144/34.1 |
| 6,148,547 A * | 11/2000 | Seigneur | .............. | A01G 23/091 144/34.1 |
| 6,345,447 B1 * | 2/2002 | Ronkko | .................. | B27B 17/14 30/383 |
| 6,427,342 B1 * | 8/2002 | Breitbarth | ............. | B27B 17/025 30/383 |
| 6,532,671 B1 | 3/2003 | Jong | | |
| 6,560,879 B2 * | 5/2003 | Franke | .................... | B27B 17/14 30/383 |
| 6,694,623 B1 | 2/2004 | Haughey | | |
| 6,701,628 B2 * | 3/2004 | Mang | .................. | B27B 17/0083 30/371 |
| 6,964,101 B2 * | 11/2005 | Graves | .................. | B27B 17/025 30/383 |
| 7,287,331 B2 * | 10/2007 | Sasaki | ..................... | A01G 3/053 16/110.1 |
| 8,136,256 B2 * | 3/2012 | Wolf | ....................... | B27B 17/02 30/381 |
| 8,434,236 B2 * | 5/2013 | Pellenc | ................... | B27B 17/14 30/381 |
| 8,707,569 B1 * | 4/2014 | Peterson | ................. | B27B 17/02 30/386 |
| 8,813,374 B2 * | 8/2014 | Lank | ...................... | B23Q 13/00 30/296.1 |
| 9,573,208 B2 * | 2/2017 | Takayanagi | .......... | B23D 57/023 |
| 2005/0178010 A1 * | 8/2005 | Petrenko | ............ | B27B 17/0083 30/383 |
| 2011/0192039 A1 * | 8/2011 | Fuchs | ................... | B27B 17/025 30/383 |
| 2015/0158199 A1 | 6/2015 | Engelfried et al. | | |
| 2015/0314470 A1 * | 11/2015 | Lundgren | ............ | A01G 23/091 30/383 |
| 2016/0052158 A1 * | 2/2016 | Luedtke | ................. | B27B 17/02 30/383 |

FOREIGN PATENT DOCUMENTS

| | | |
|---|---|---|
| EP | 0 993 767 | 4/2000 |
| GB | 539956 | 9/1941 |
| SE | 518366 | 10/2002 |
| SU | 1329966 | 8/1987 |
| WO | 97/19794 | 6/1997 |
| WO | 2014-001066 | 1/2014 |

OTHER PUBLICATIONS

European Office Action dated Apr. 13, 2018 in corresponding European Patent Application No. 13 784 375.1.

* cited by examiner

METHOD AND GUIDE BAR CLAMPING ARRANGEMENT RELATED TO A MOTOR SAW

TECHNICAL FIELD OF THE INVENTION

This invention refers generally to a method and an arrangement related to a motor saw, primarily to a motor saw which with its guide bar arrangement is intended and dimensioned to be able to cut trees and timber.

With regard to motor saws in accordance with the present invention, they are all based on a motor saw in the form of a motor saw arrangement having a drive motor unit and a guide bar arrangement adapted to the drive motor unit, which with the assistance of a wedging or clamping arrangement can take either an activable position or an inactivable position.

The present invention is concentrated to a "coordinating arrangement" of the drive motor unit with the guide bar in a guide bar arrangement intended as a clamping (and/or loosening) arrangement for one end portion, the inner end portion or the end area of said guide bar, by indicating the existence of an arrangement between the guide bar and the chassis of the drive motor acting and for clamping the saw or guide bar or loosening the saw or guide bar against and away from the chassis, here abbreviatedly designated coordinating arrangement, as in the form of a mechanical means.

More specifically, the present invention is intended to be applied to a motor saw, wherein said motor saw with its chassis comprises a drive motor unit, the rotatable shaft of which is adapted to support a drive disc, such as a toothwheel, provided with teeth around the periphery of the drive disc, around which toothwheel a portion or section of an endless saw chain is adapted to run, which saw chain also is adapted to run with its remaining portions in such manner along the guide bar as to create a guide bar arrangement, in which the reminding portions of the saw chain are to run along tracks allotted to side edges directed away from the guide bar, and a relinking disc, such as a toothwheel or the like, allotted to the other (external) end portion of the guide bar driven by the translation movement of the saw chain.

The present invention is based on a motor saw arrangement having its drive motor unit adapted to support the guide bar arrangement over said coordinating arrangement adapted to the chassis for clamping the guide bar, said arrangement being adapted to be able to take an activable position in which the chassis included in the drive motor unit becomes solidly and fixedly anchored related to the guide bar in the guide bar arrangement or an inactivable position in which the chassis of the drive motor unit becomes loosely and freely related to the guide bar arrangement and its guide bar.

In this inactivable position, the guide bar is to be displaced from the drive motor unit and its chassis by a relative motion in a direction related to a plane through the guide bar so as thereby to release the guide bar from the drive motor unit and its chassis and thus to set forth during the mentioned inactivable position a guiding pattern to follow for removing the guide bar from the chassis, wherein said arrangement has been brought to its inactivable position by loosening said clamping means, and during this inactivable position of the arrangement loosening said saw chain from the guide bar and its relinking disc and displacing the guide bar with one of its ends facing the drive motor, i.e. its inner end portion, along a plane allotted to the guide bar and oriented through the side edges of the guide bar and out of the inactivated position of the clamping arrangement.

In the following description of the present invention the subsequent definitions have been utilized to advantage:

A motor saw comprises a drive motor unit which over an activated "coordinating arrangement" and/or an interrelated arrangement solidly supports a guide bar arrangement with an extended saw chain.

A drive motor unit is to comprise a chassis and said drive motor as well as a support plate anchored to the chassis and included in a clamping or coordinating arrangement.

A guide bar arrangement is intended to comprise a guide bar having a mounted saw chain running along the side edges of said guide bar, with the saw chain being controlled by tracks disposed along side edges directed away from each other by the guide bar, said guide bar arrangement exhibiting a relinking disc inside the other or external end area of said guide bar.

Guide bar concerns a unit where its external, second end area supports a relinking disc and its inner, first end area faces the drive motor unit and is designed for solid cooperation with an arrangement adapted for tightening or clamping the guide bar against the chassis.

A clamping arrangement is based on utilizing a support plate tightly related and anchored to the chassis of the drive motor unit and a clamping plate cooperating therewith and intended in an activable position to be able to cooperate clampingly with and to support the inner, first end area of the guide bar facing the drive motor unit by activating a clamping means between said clamping plate and said support plate and in an inactivable position releasing the clamping cooperation by loosening said clamping means.

A clamping unit is based on a unit which is intended to be able to tighten or clamp the interior area or first end area of the guide bar with the help of a displaceable clamping plate acting against a fixed support plate and utilizing a clamping means extending through one or two holes or notches in the clamping plate and loosening the clamping function in an inactive position by loosening the clamping means.

Clamping means are adapted to cooperate with the support plate with a threading and to be permitted to pass freely through the clamping plate and normally consist of a threaded bolt or a nut corresponding to the threading.

Means extending (or slackening) the saw chain towards the guide bar have the purpose of displacing the guide bar arrangement from the drive motor unit and locking the guide bar arrangement relative to the chassis of the drive motor unit. These means are disposed displaceably forward and backward to extend or slacken the saw chain.

Coordinating arrangements have the purpose of defining a known clamping (loosening) arrangement which in an activable position can properly hold on to the drive motor unit and the guide bar arrangement with a clamping force and in an inactivated position without clamping force can release the guide bar from the drive unit by completely removing said clamping plate as a separate unit from the support plate.

Interrelated arrangement has the purpose of indicating, according to the present invention, a clamping arrangement or a clamping unit and its clamping means extending from said support plate and through said clamping plate, said arrangement in an activated position being intended to define an arrangement which in said activable position with a clamping force can properly hold the drive motor unit and guide bar arrangement and in an inactivable position without the clamping force can release the guide bar from the drive motor unit by displacing the clamping plate from the support plate at least a distance to a stop means exceeding the thickness of the guide bar arrangement but still remaining interrelated or linked together with each other for forming said arrangement which is open for receiving or laying open the inner first end area of the guide bar, where in a displacement between activated or inactivated positions is to be a displacement of said clamping plate.

The prior embodiment shown and described is to combine the clamping or interrelated arrangement with the means extending (or slackening) the saw chain towards the guide bar by using a piston-cylinder arrangement activating the support plate for the inner first area of the guide bar arrangement in a to and away directed movement oriented in a plane ("P") of the guide bar.

Known motor saw arrangements and their drive motor units to which their guide bar arrangements may be secured and released are for practical reasons divided into two categories in dependence of their application as hand operated motor saw arrangements having simple drive motor units and simple guide bar arrangements and vehicle related and remote controlled motor saw arrangements, respectively, having strong drive motor units and strong and rigid guide bar arrangements.

The present invention intends primarily to find its application in vehicle related and remote controlled motor saw arrangements, where the vehicle is in the form of a timber harvesting arrangement or equipment.

The clamping arrangement or the coordinating arrangement and/or the clamping unit may expose an inactivated position, wherein the guide bar is to be freely related to the chassis of the drive motor unit and the guide bar may directly and in its plane ("P") be moved or displaced from its inner position, wherein the saw chain can be brought out of cooperation with the guide bar arrangement and from this inner position, by a displacement, remove the guide bar arrangement from the support plate related to the chassis of the drive motor unit.

In motor saw units or motor saw arrangements of the kind described above it is known to relate to the drive motor unit a means extending the saw chain, wherein said means in an inactivated position may displace the guide bar and its arrangement in a direction away from the drive motor unit by using one or more metal pins (as 6 mm in diameter), thus extending the saw chain.

It is previously known, especially in a harvesting arrangement or equipment, to rapidly activate the clamping arrangement from its activated (clamped) position to its inactivated (loosened) position or vice versa in an attempt to release the guide bar and in such released position turn said bar upside down or exchange one bar for a new one.

It has also been noted that specifically the end portion or end area of the guide bar facing the drive motor unit, the inner end area and inside of the clamping and coordinating arrangement create high and concentrated power forces and turning (torque) strains when the free end portion of the guide bar arrangement is subjected to a strong and/or short high rotational or torque bending factor ("M") active with in the plane ("P") allotted to the guide bar.

Particularly difficult concentrated forces appear when the inner end area is provided with a long centrally oriented slit for clamping cooperation between a support plate and a clamping plate of the clamping arrangement. It has then turned out that this torque ("M") can result in a plastic deformation in its inner end portion. Compare here FIG. 12. The inner end portion (2*d*) of the guide bar arrangement is thus to be able to act to clamp and without any rotational function act between the support plate surface and the clamping plate surface.

BACKGROUND OF THE INVENTION

Methods, arrangements, and structures related to the technical field mentioned above and having a function and being of a character which fulfils the requirements as proposed are known in the prior art in a plurality of different embodiments.

Thus it can be mentioned that harvesting arrangements or equipments of the relevant type which support its drive motor unit and to which unit a guide bar arrangement is easily applicable and easily separable over a clamping and coordinating arrangement are adapted to extend with their endless saw chain from a drive disc allotted to the drive motor unit, said drive disc ordinarily being shaped as a toothwheel, and the saw chain tracks along and around the guide bar to form the guide bar arrangement.

The drive motor unit comprises i.a. a means extending (or loosening) a saw chain towards the guide bar for enabling fastening (and loosening) the drive motor unit to and from the guide bar and in a clamping condition means to allow a limited displacement movement of the guide bar arrangement with regard to the drive motor unit, normally for extending the saw chain.

Motor saws and motor saw arrangements of the type belonging thereto are as a rule driven by a hydraulic circuit placed under an hydraulic overpressure and which over controllable hydraulic valves can feed a drive motor driven by hydraulic pressure within the drive motor unit with a controllable hydraulic flow and the hydraulic pressure which it requires for generating the necessary amount of power so that such motor saw may be driven under more or less maximized conditions.

Such maximized conditions are well developed in the field of tree and timber harvesting or logging, wherein the conditions refer i.a. to letting the saw chain operate in a maximized translation movement, such as 40 meters per second, and controlling the engagement pressure between the cutting teeth of the saw chain and a wooden material intended for being cut, primarily in the form of logs and timber, and wherein an adapted engagement pressure and a cutting capacity can be controlled by the momentary number of revolutions of the drive motor and its disc and choosing the diameter and number of teeth for the toothwheel driven by the drive motor unit, wherein said toothwheel is to be driven by a hydraulic motor, and selecting the volume of the driving motor and hence its number of revolutions dependent on the chosen maximized translation movement.

As an example of the background of technology and the technical field to which the present invention refers with regard to motor saws in general and particularly to motor saw arrangements or units may be mentioned the presence of a clamping and for coordinating arrangement between a drive motor unit and a guide bar arrangement adaptable to the drive motor unit and in which a unit and/or an arrangement are attached but easily removable from each other via said clamping and coordinating arrangement with its clamping means.

As an example of the background of technology and the technical field to which the present invention refers may be mentioned a guide bar arrangement having a specific shape of its inner end portion of the guide bar, which is shown and described in European Patent Application EP 0 993 767 B1.

Figure 2:
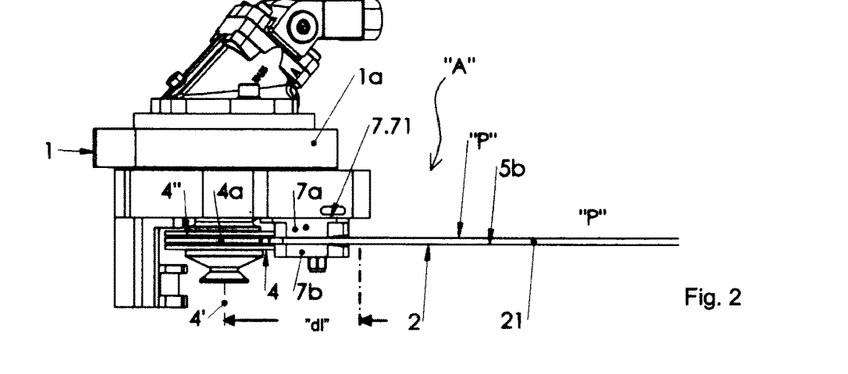
FIG. 2 shows a horizontal view of the drive motor unit attached to the inner portion of a guide bar or its end portion (without the saw chain) over an activated interrelated arrangement according to FIG. 1.

Here a motor saw arrangement shown and described being designed with the inner first end portion or area of said guide bar (according to the following FIG. 12) is not only provided with a centrally located slot (40), which extends partly along the guide bar, corresponding to known technology (according to FIG. 2), but is also provided with two side-disposed guiding holes or slots for adapting a chosen extension of the saw chain along the guide bar over an arrangement extending the saw chain and its guide bar by on the one hand moving these slots towards the edge surface of the guide bar and furthermore shaping the center lines of these slots so that they connect to the direction of a central middle line of the slots and with slots opening symmetrically oriented to said edge portion.

A support plate and a clamping plate are here shaped to cover solely part of the central slot.

To the earlier standpoint of technology belong also the measures that are required to rapidly be able to inactivate the clamping arrangement and without a saw chain to loosen and turn around or replace one guide bar by another alternatively in connection therewith to initially replace a utilized saw chain and/or a guide bar by a new such one.

Different clamping arrangements have also been proposed, which have been formed such, that replacing of a guide bar arrangement and/or a guide bar can be carried out with simple means and having loose and separatable components, which might be lost in difficult terrain and/or snow during a replacement sequence.

Various clamping means have also been proposed, which in inactivable position will offer a guide bar movement in the direction from the drive motor unit, the chassis thereof and along a plane of the guide bar and its support plate.

Manual actuation of the tightening or clamping arrangements to inactivable or alternative activable positions have also been proposed, where the clamping arrangement can serve as a means extending the saw chain towards and along its guide bar.

Patent Publication U.S. Pat. No. 5,709,254 A according to FIGS. 4 and 5 shows a chassis related arrangement with a support plate (106) and a clamping plate (104) as well as clamping and/or loosening means (a bolted joint).

It is specifically indicated that the guide bar (100) and particularly two blocks (104, 106) allotted to the illustrated arrangement can be displaced in active position for extending and/or slackening the saw chain over means intended for this, for example letting the saw chain extend along said guide bar.

The principle of this arrangement can be considered to imply that when the arrangement is disposed in activable position the end portion of the guide bar facing the chassis and attached by a bolted joint and being disposed in an inactive position, such as for replacement of the guide bar, there is a coordinated arrangement requiring that the clamping plate (104) be removed and displaced as a unit entirely from the chassis so that the guide bar is made free in such manner.

Thus, the clamping plate (104) must during its inactive position be entirely removed from the chassis as an independent unit.

In the inactivated position, i.e. a position in which the guide bar and saw chain have been removed from their attached position in the motor unit or chassis and where the guide bar with mounted and stretched saw chain is to be introduced into the arrangement to an activating and tight-holding position, at least the clamping plate (104) belonging to the arrangement and its means or bolt joint will exist in individual loose parts that may easily go lost.

Patent Publication U.S. Pat. No. 3,870,125 A shows and describes a clamping arrangement that in a position illustrated in FIG. 7 requires two bolts (28, 30) secured to the chassis, said bolts being adapted to support said guide bar by a within said end area formed slot (20) and where said clamping plate (42) is to clamp said guide bar and its mounted saw chain by using two nuts (34).

In said inactivated position such a coordinating arrangement requires that said clamping plate (42) and at least two nuts (34) are kept as separated easily lost parts.

Patent Publication GB 539956A shows and describes a clamping arrangement in the form of a coordinating arrangement having a clamping plate and a support plate, where screws (18) are adapted to be formed to fit key holes (17) in order to secure the inner area of the guide bar (8).

In an inactivated position this coordinating arrangement requires that at least the clamping plate is formed as a separate part.

Patent publication U.S. Pat. No. 3,870,125 A shows and describes an arrangement having two separated clamping plates (7, 8), where one can be considered as a support plate and the other as a clamping plate with an intermediate guide bar (3) and in activated position the two plates (7, 8) and the guide bar (3) are clamped by nuts (10).

In inactivated position such a coordinating arrangement requires that at least one plate (8) and in any case two nuts (10) are in the form of loose, easily lost, parts.

STATEMENT OF THE PRESENT INVENTION

Technical Problem

Considering the circumstance that the technical considerations which a person skilled in the art of the relevant technical field must handle in order to offer a solution of one or more technical problems are on the one hand initially having a necessary insight in the measures and/or the sequence of measures which are to be taken and on the other hand a necessary choice of the or those means which are required, the following technical problems should on the basis of this be relevant in developing the present subject of invention.

Considering the earlier standpoint of technology as it has been described above it should therefore be seen as a technical problem to be able to set forth a method and an arrangement and thereby to be able to understand the significance of, the advantages related to and/or the technical measures and considerations which will be required in a method in accordance with the preamble of claim 1 and in an arrangement in motor saw equipment in accordance with the preamble of claim 3 indicating the existence of a tightening, clamping and interrelating arrangement for a guide bar having a lower support plate, an upper clamping plate and a clamping means extending there between so that the guide bar and particularly the chassis allotted to the drive motor unit can cooperate definitely and anchored with the drive motor unit and wherein the arrangement rapidly can be changed from an active position to an inactive position or vice versa and apart from this can be adapted to be able to take up and stand up against bending stresses or torques at an inner end of the guide bar, its inner end portion and resulting from a rotary or torque force ("M") initiated in the other free end portion of the guide bar, such as when being driven in a cutting process.

There is a technical problem in being able to understand the significance of, the advantages related to and/or the technical measures and requirements which will be necessary for allotting a method and an arrangement for bringing a guide bar out of cooperation with its clamping or interrelating arrangement, wherein a support plate and a clamping plate allotted to an interlinking or interrelated arrangement for bringing the inner end portion of an intermediately lying inner end portion of a saw chain to an inactivable position, in which the clamping plate and/or the end portion in a first mode of motion can be displaced in a direction away from the support plate and in a second mode of motion, can displace said end portion of the guide bar along a plane ("P") allotted to said guide bar and out of the inactivated position of the interrelated arrangement.

There is a technical problem in being able to understand the significance of, the advantages related to and/or the technical measures and considerations which will be required for indicating and suggesting an arrangement with its support plate to be adapted for a displacement initially during an inactivated position for said arrangement so as to let the width of the support plate primarily serve as a unit taking up bending forces and/or tension torque activated at the free end portion of the guide bar through static friction.

There is a technical problem in being able to understand the significance of, the advantages related to and/or the technical measures and considerations which will be required for choosing, in a method and an arrangement, a support plate solidly related to and anchored to the chassis, for said interrelated or linking together, alternatively a clamping plate having two short outwardly directed (such as sidewardly directed, upwardly directed or downwardly directed) projections or studs in said support plate and/or clamping plate adapted for cooperation with individual recesses and a clamping means arranged inbetween said projections, as a bolt or nut with a threading which primarily clamps the clamping plate towards the support plate.

There is a technical problem in being able to understand the significance of, the advantages related to and/or the technical measures and considerations which will be required for indicating and suggesting an arrangement related to a motor saw according to the preamble of claim 3, with a clamping and/or interrelated arrangement having a clamping plate and a clamping means and a support plate or the like which can initially be displaced during an inactivated position or said arrangement a distance away from said support plate, as a distance exceeding a chosen thickness of the guide bar unit, with the inner end area and/or said clamping plate within a first mode of motion being adapted to be displaced in a first direction from said support plate and with the guide bar unit within a succeeding second mode of motion being adapted to be displaced along a plane of the guide bar unit and out of its inactivated position for said arrangement.

More specifically the present invention discloses an interrelated arrangement and makes use of a rigid and anchored support plate and a displaceably oriented clamping plate along its clamping means in order to clamp the inner area of an intermediate guide bar to form an activated position or inactivated position.

There is a technical problem in being able to understand the significance of, the advantages related to and/or the technical measures and considerations which will be required for indicating and suggesting a method and an arrangement where short outwardly directed (such as sidewardly directed, upwardly directed or downwardly directed) studs in the support plate and/or clamping plate having a high dimension corresponding to or at least are somewhat less than the thickness of the guide bar unit.

There is a technical problem in being able to understand the significance of, the advantages related to and/or the technical measures and considerations which will be required for suggesting a method and an arrangement wherein said short projections or studs are allotted a circular and/or a somewhat elliptical cross section.

There is a technical problem in being able to understand the significance of, the advantages related to and/or the technical measures and considerations which will be required for suggesting a method and an arrangement, wherein a cross section or a diameter of at least one of the projections or studs can be chosen to 15 to 25%, such as around 20%, of the length of the support plate or the clamping plate, measured crosswise of the direction of the guide bar.

There is a technical problem in being able to understand the significance of, the advantages related to and/or the technical measures and considerations which will be required for indicating a method and an arrangement wherein the support plate and/or the clamping plate in an interrelated arrangement are shaped as a stylized right prism or prismatic form and its projections are chosen to a cross section and with a diameter of 10 to 20%, such as around 15%, of the length of the support plate.

There is a technical problem in being able to understand the significance of the advantages related to and/or the technical measures and considerations which will be required for suggesting a method and an arrangement in which a distance between two each other facing, as circular or elliptical, projections or studs is adapted to 50% to 60% of the length dimension of the support plate.

There is a technical problem in being able to understand the significance of, the advantages related to and/or the technical measures and considerations which will be required for indicating a method and an arrangement in which the clamping and/or interrelated arrangement in inactivable position but carrying the inner end portion of the guide bar can with its displaced, but still interrelated, clamping plate move a right angular distance from the support plate which exceeds the thickness of the guide bar by 80-110%.

The Solution

The present invention takes as its starting point the known technology indicated by way of introduction and concerns a method and an arrangement for in a motor saw, in the form of a motor saw arrangement with a drive motor unit and a guide bar arrangement adapted to the drive motor unit of the motor saw, said drive motor unit with its chassis comprises said drive motor having a rotatable shaft adapted to support a drive disc such as a toothwheel with teeth around its periphery, around which a portion of an endless saw chain runs. Said saw chain is also adapted with its additional portions or remaining portions to run along tracks allotted to the away-directed side edges of the guide bar and a relinking disc allotted to the outer end portion of the guide bar and being driven by a translation movement of the saw chain, such as a toothwheel or the like, wherein the motor saw arrangement is adapted with its drive motor unit to support a guide bar arrangement over a tightening or clamping arrangement, such as a mechanical means, for fastening the guide bar arrangement against said chassis, as an adapted and interrelated means, such as in the form of a mechanical means, said interrelated arrangement being adapted to be able to take an activable position in which the chassis included in the drive motor unit becomes fixedly or anchoredly related to the guide bar arrangement and its guide bar or an inactivable position in which the chassis of the drive motor unit becomes loosely or freely related to the guide bar or its arrangement and in this inactivated position, by a relative motion or displacement in a direction from the drive motor unit and its chassis, said saw chain and guide bar are released from the drive motor unit and its chassis, and to indicate under the mentioned inactivated position an action pattern for removing the guide bar from the chassis, wherein said interrelated arrangement can be brought to an inactivable position by loosening said clamping means and loosening from the arrangement at least said saw chain from the guide bar and its relinking disc and displacing the guide bar with its end portion facing the drive motor or end area along a plane allotted to the guide bar and oriented through forwardly directed side edges of the guide bar as well as out of the inactivated position of the arrangement.

Thus the present invention indicates that an arrangement for interrelating or linking together is allotted a rigid and anchored support plate and a movable or displaceable clamping plate activated by a clamping means for clamping the inner end portion of an intermediately lying guide bar when said arrangement is brought to an inactivable position and the clamping plate and/or end portion is in a first mode of motion displaced in a direction up and away from the support plate and in a second mode of motion said end portion is displaced as well as its guide bar along a plane allotted to the guide bar and out of the inactivated arrangement and in a counterdiversion displaced into said interrelated arrangement for a clamping sequence according to claims 1 and 3.

Additional characteristics of the invention may be found in the subclaims.

Advantages

The advantages which primarily must be considered as characterizing the present invention and the specific significant characteristics disclosed thereby are that in this manner prerequisites have been created for indicating, in a method according to the preamble of claim 1 or an arrangement according to the preamble of claim 3, that the guide bar is by an interrelated arrangement adapted for clamping to the drive motor unit, such as in the form of a clamping unit and a clamping means, and with the therein included support plate and/or a movable or displaceable clamping plate or the like, intended for clamping the guide bar.

Clamping means within the clamping interrelated arrangement are, during an inactivated position of the arrangement, with the purpose of loosening the guide bar displaced perpendicularly a chosen distance, such as exceeding a chosen thickness of the guide bar.

The inner end portion of the guide bar facing the drive motor unit and/or the clamping plate is initially in a first mode of motion to be able to be displaced in a first direction from the support plate and the guide bar only in the form of a second, subsequent mode of motion is to be able to be displaced along a plane allotted to the guide bar and in a direction from the support plate interrelated with the clamping plate and out of the inactivated arrangement.

Retaining a guide bar and its inner end portion will then be able to occur in reverse order.

The invention indicates that an interrelated arrangement is to be allotted a fixed and anchored support plate and a movable or displaceable clamping plate for clamping the inner end portion of an intermediately disposed guide bar, and wherein the clamping plate is brought to an inactivable position, wherein the clamping plate and/or the end area in a first mode of motion is displaced in a direction from the support plate and thereafter, in a second mode of motion, the end area of the guide bar is displaced along a plane allotted to the guide bar and out of the inactivated interrelated arrangement.

It is further indicated that a support plate for the arrangement properly anchored to the chassis can be chosen with at least two short outwardly directed projections or studs adapted for cooperation with peripheral recesses allotted to the inner portion or area of the guide bar and a clamping means extending between the projections, such as being attached to the support plate and passing freely through the clamping plate, such as at least a screw thread allotted to the support plate, said screw thread in the activated position securing the guide bar between the support plate and the clamping plate.

The subject matter that must be considered as being characterizing of a method in accordance with the present invention is set forth in the characterizing part of the following claim 1, and the subject matter which primarily must be considered to be characteristic of an arrangement in accordance with the present invention is disclosed in the characterizing portion of the following claim 3.

SHORT DESCRIPTION OF THE DRAWINGS

Prior art and presently proposed embodiments exhibiting the significant characteristics related to the present invention will now be described with reference to the accompanying drawings with the purpose of showing examples. In the Figures.

DESCRIPTION OF THE PRESENTLY PROPOSED EMBODIMENTS

It shall now by way of introduction be pointed out that in the subsequent description of the presently proposed embodiments which exhibit the significant characteristics of the invention and which are clarified by the drawings shown in the following we have chosen terms and specific terminology with the purpose of thereby primarily clarifying the basis of the invention.

However, in this connection it should be noted that the terms chosen shall not be seen as limited solely to the ones utilized and chosen here and it shall be understood that each such chosen term is to be construed such, that it in addition comprises all technical equivalents which function in the same or basically the same manner for thereby being able to achieve the same or essentially the same purpose and/or technical effect.

Figure 13:
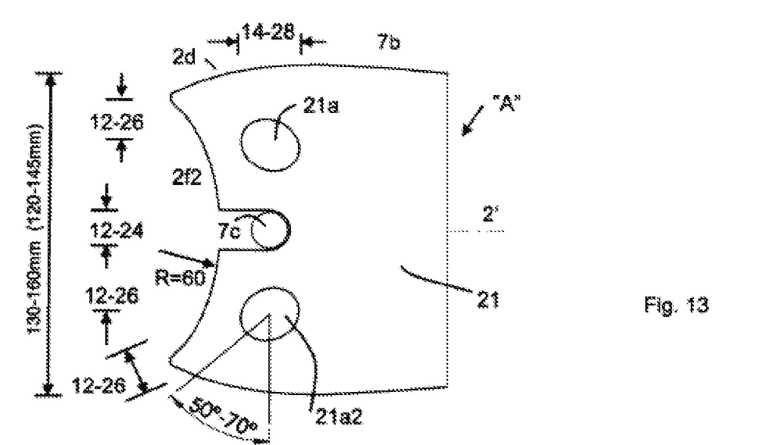
FIG. 13 shows a plan view of the inner end portion of a guide bar having somewhat elliptically shaped recesses and being provided with introduced measurements and with the clamping means disposed within a center line of the two recesses but closely related to the end portion of the slit.

Thus, with reference to the accompanying drawings FIGS. 1 to 15 and partially FIG. 13, the latter schematically and in detail show the basic prerequisites of the present invention, wherein the significant characteristics of the invention have been set forth by the now proposed and in the following more specifically described embodiments concerning a motor saw and a motor saw arrangement illustrated here and allotted the reference designation "A".

Figure 1:
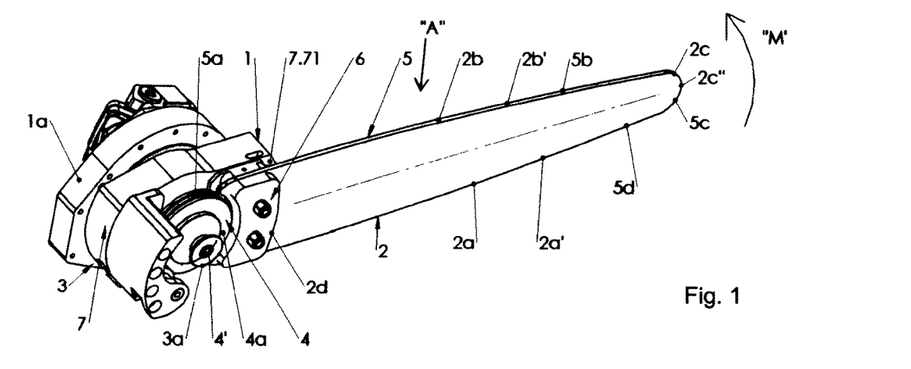
FIG. 1 shows a perspective view of a motor saw illustrated as a motor saw arrangement having a drive motor unit which by means of an "interrelated arrangement" or a clamping arrangement is to be able to support a guide bar arrangement, wherein this drawing is shown in a horizontal view in accordance with the indications of the invention.

Thus, FIG. 1 shows in a perspective view said motor saw arrangement "A" having a guide bar arrangement 2 adaptable to the drive motor unit 1 of a motor saw, wherein said drive motor unit 1 comprises a drive motor 3 of known structure and not more specifically shown.

This drive motor 3 is permanently connected to the chassis 1a of the drive motor unit 1, with a rotatable axis 3a being adapted to directly support an easily replaceable driving pulley 4 here shaped as a toothwheel 4a (FIG. 2) provided with external teeth, said toothwheel being adapted to cooperate with inwardly facing cogs or teeth of a saw chain, said cogs being disposed within a portion 5a of an endless, not shown, saw chain 5, which saw chain 5 also is adapted with additional portions to run along tracks 2a', 2b' allotted to side edges 2a, 2b directed away from the guide bar 21, and a guide bar arrangement's 2 external end area 2c' of the guide bar 21 allotted, by the motion of said saw chain 5 driven disc, a relinking disc 2c, a cog wheel or a toothwheel 2c" or the like.

Thus the endless saw chain 5 will run with a first portion 5a over a driven drive disc 4 or toothwheel 4a and, with a second portion 5b along the track 2b', will run with a third portion 5c over the relinking disc 2c or the toothwheel 2c" and with a fourth portion 5d will run along track 2a' for again being connected to said first portion 5a.

Figure 3:
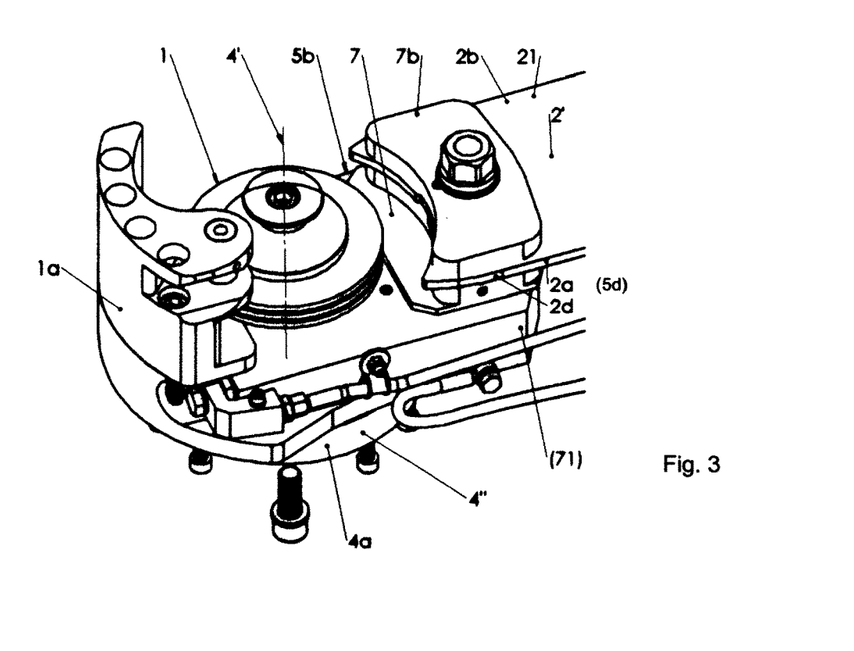
FIG. 3 shows in a perspective view an arrangement with the saw chain extended towards its guide bar and with an arrangement of piston and cylinder displaceably supported by the chassis of the drive motor unit and having two removable or displaceable clamping means.

The embodiment more specifically shows that the periphery 4" of this drive disc 4 or toothwheel 4a is to be adapted such, that its periphery can be distributed with a number of cogs or teeth connecting to a value chosen between 20 and 24, such as more specifically the value 22, which is applicable in the perspective side view illustrated by FIG. 3.

The invention is further based on a structure of the motor 3 not shown in detail and which primarily is to be of a known standardized and a chosen hydraulic type that may be driven by an overpressure.

In this connection it should be noted that the mentioned values 20 to 24 above and specifically the value 22 are primarily to refer to a standardized hydraulic drive motor unit 1 having a hydraulically driven hydraulic motor (volume 34 cm$^3$) connected to said guide bar arrangement 2 with a specific design of its width dimension and utilizing a larger drive disc or toothwheel 4a deviating from standardizing and utilizing a means 7, 71 extending (or slacking) the saw chain 5 towards the guide bar 21.

Said means 7, 71 are more or less the same as the interrelated arrangement.

An increase of the volume of the hydraulic motor is indicated here without substantially having to change the fastenings of an earlier utilized drive motor to the chassis 1a of the drive motor unit. Here an increase of the periphery 4" of the drive disc 4 or toothwheel 4a occurs without being carried out having to substantial changes of the structure and construction of the drive motor unit 1.

Additionally, with a further increase of the number of cogs or teeth 4a around the periphery 4" of the drive disc or toothwheel 4a, up towards a value of 30 or more, a special structure should be considered with regard to the drive motor unit 1 as the guide bar arrangement 2 and when utilizing an arrangement 7 extending the saw chain 5 towards the guide bar 21.

According to the invention, the hydraulically acting drive motor 3 construction should be chosen of standard type and dimensioned with a volume of between 25 and 40 cm$^3$. More specifically the present invention gives the indication that the volume can be adapted and chosen to more than or somewhat over 30, such as between 30 and 35, such as more specifically a hydraulic motor having a volume of 34 cm$^3$.

Furthermore, it is important to the invention that the chosen drive motor 3 is to be adapted to be driven at a controllable and comparatively low number of revolutions, at least between 4500 and 6000 revolutions per minute (RPM), such as chosen between 5000 and 5500.

The invention has chosen a hydraulic motor of 34 cm³ and a drive disc 4 or a toothwheel 4a with 22 along the periphery 4″ evenly distributed cogs 4a and drivable up to a maximum number of revolutions of 5300 revolutions per minute (RPM) or there around.

The invention is thus based on utilizing in this connection a chosen large hydraulic motor drivable with a rotatably low number of revolutions in order to be able to increase the driving security of the motor. This hydraulic motor 3 is to be able to be fastened to already positioned fasteners or easily modified fasteners for a standardized drive motor unit 1 and its chassis 1a.

However, it is required that the velocity of rotation and a number of cogs or teeth distributed around the periphery 4″ of the drive disc or toothwheel 4a are to be coordinated mutually in order to allot the saw chain 5 a translation velocity which will be limited only by requirements related to the chosen chain structure.

For the saw chain constructions mentioned by way of introduction the maximized speed has been chosen to 40 meters per second or thereabout. In choosing a speed of over the mentioned 40 m/sec will result in an immediate danger of the chain braking while in operation.

Figure 4:
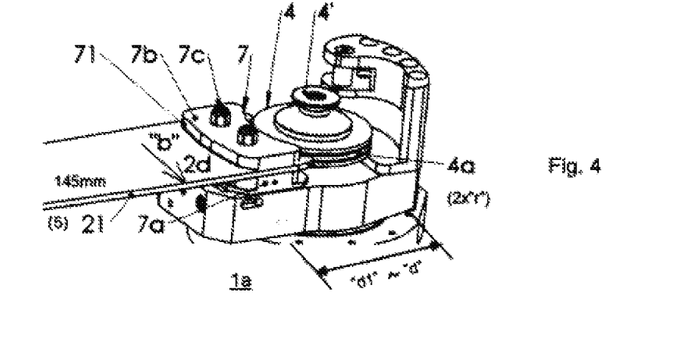
FIG. 4 shows a different perspective view than FIG. 3 comprising a removable clamping arrangement cooperating with the inner (its first) one of and partly removable interrelated arrangements.

Practical tests show that said drive disc 4 or toothwheel 4a should be allotted a diameter of approximately 130-160 mm and that the inner guide bar portion or end area 2d facing the drive disc 4 and the drive motor unit is adapted to be somewhat wider than a chosen diameter "d" (in FIG. 4). It is here suggested approximately 10-20 mm wider. FIG. 4 illustrates a guide bar 21 having a width dimension of 145 mm.

With regard to the guide bar arrangement 2 indicated by the invention, its width dimension "b" (in FIG. 5) of its inner end portion can be directly adapted to the diameter of a drive disc or wheel 4 having a greatest number of teeth. For smaller diameters the saw chain 5 should leave the drive disc 4 in a direction obliquely outwards as compared to a tangent allotted to the periphery 4″ of the wheel for engaging cooperation with the track 2b′.

More specifically it is indicated that a distance "d1" in FIG. 4 is to be chosen between the center 4′ of the drive disc 4 or the toothwheel 4a and a part or supporting plate 7a of the mechanical means 7 allotted to guide bar 21, said support plate being illustrating here as a support plate having a fastening means for fastening the guide bar arrangement 2 over its sword portion or end area 2d to the chassis 1a of drive motor unit 1, wherein this distance "d1" is to be adapted short, such as connecting to the diameter (2×"r") of the drive disc or toothwheel 4a or somewhat larger in order to be adapted to a motor saw construction intended and constructed for drive discs or toothwheels having a lower number of teeth than the ones proposed here.

In addition, the invention indicates the existence of an arrangement of the drive motor unit related saw chain 5 in the guide bar arrangement with regard to the drive motor unit, extending arrangement (combined with an arrangement clamping or interrelating the guide bar), e.a. in the form of a piston-cylinder-arrangement (71) in FIG. 3. Said arrangement being active between the chassis 1a of drive motor unit 1 and the guide bar 21 of the guide bar arrangement 2 adjacent to its inner guide bar portion or end area 2d, wherein this arrangement is adapted to be activable by an adapted hydraulic pressure under an immovable saw chain 5, wherein said hydraulic pressure by means of a guide valve or other valves (not shown) allotted to the drive motor unit is locked and static under a non rotating operation of the drive disc 4 or the toothwheel 4a and the subsequent driving of the saw chain 5 being able to hold the saw chain extended during a cutting phase, such as within limits chosen beforehand.

This static hydraulic pressure is then to be active during one or a plurality of cutting processes chosen beforehand and in consideration of the chosen cutting pressure against a wooden base and the width dimension and/or the cross section of the cutting or the cutting track.

Figure 5:
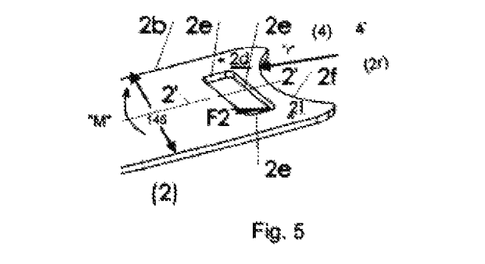
FIG. 5 shows a perspective view of a guide bar's first (its inner one) towards the driving motor unit facing inner end portion having a rectangular recess related to the guide bar extending the saw chain and an interrelated arrangement having a torque ("M") active to the free (other) end area of the guide bar.
Figure 6:
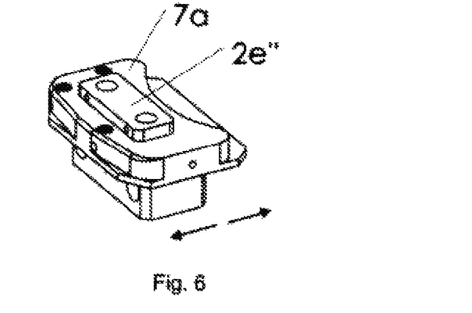
FIG. 6 shows a perspective view of an arrangement extending the saw chain towards the guide bar and the chassis of the drive motor unit to the fixed and anchored support plate according to the invention belonging to the arrangement linking or interrelating together with the guide bar having a centered rectangular projection connecting to a centered recess according to FIG. 5 for the inner end portion of the, side facing the drive motor unit.

More specifically it is indicated that the arrangement 7 extending saw chain 5 towards guide bar 21 can be adapted with a fastening means in the form of a support plate 7a and a displaceable clamping plate 7b to cooperate with a recess or opening 2e shaped to the guide bar 21 adjacent to the guide bar portion or the inner end area 2d, said recess being rectangularly elongated and connecting in FIG. 5 to a rectangle having a longer side portion 2e′ oriented crosswise of a lengthwise oriented center line 2′ of said guide bar arrangement 2.

FIG. 5 shows a plan view of a part of the open-lying guide bar 21 of a guide bar arrangement (2) and particularly its inner end portion 2d and its partial portion 2d facing the drive motor and having a rectangular opening or recess 2e serving as a first embodiment and being disposed crosswise of a center line 2′ allotted to the guide bar arrangement (2), wherein this end portion 2d here is allotted a width dimension "b" of 145 mm and is provided with a curved edge 2f connecting to a portion of a circular line, said edge in its turn being dimensioned for connecting tightly, or at least closely to engage, the radius of curvature "r" of drive disc or toothwheel 4a, here designated (2r) for its diameter.

The part or edge 2f should have a value of the radius of curvature corresponding to (r+10 to 20 mm).

FIG. 5 illustrates that a straight edge 2e′ formed by the rectangle is to face said drive disc (4) and to lie crosswise to its center line 2′.

Figure 7:
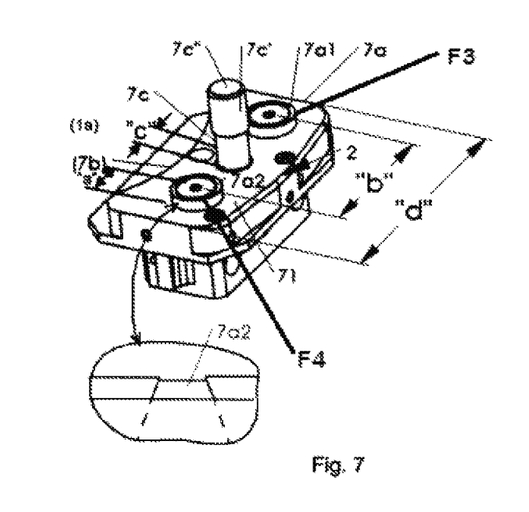
FIG. 7 shows a perspective view of a rigid and anchored support plate having two side related short projections (stubs) each connecting to a recess of the inner end portion of a guide bar according to FIG. 8, with a clamping means and with an enlarged view over an upwardly cone shaped projection for cooperation with a recess exhibiting a corresponding cone shape in the inner end portion of the guide bar.

The motor saw arrangement "A" with its drive motor unit 1 is adapted to support the guide bar arrangement 2 over a clamping or interrelating arrangement 71 in FIG. 7, as a mechanical means, for clamping the guide bar 21 against the chassis, adapted as coordinated with and/or clamping together such as a saw mechanical means, said arrangement 71 being adapted to be able to take an activable position in which the chassis (1a) included in the drive motor unit 1 will become solidly related to and anchored to the guide bar arrangement and its guide bar 21 or an inactivable position in which the chassis (1a) of drive motor unit 1 will be loosely related to the guide bar arrangement 2 and its guide bar 21 and in this inactivated position, by a relative motion in a direction from the support plate 7a and thereafter in another direction from its chassis (1a) release from said drive motor unit said mentioned guide bar 21 and its inner end area 2d.

The invention is based on shaping the interrelated arrangement 71 as a fixed or anchored support plate 7a and a displaceable clamping plate 7b (FIG. 9) for in an active position properly holding solely the inner end area 2d of the guide bar 21 and as a guide bar arrangement 2 being able to take up the forces which are to be referred to the bending or rotational motion "M" which can become active at the end of the outer end portion or area 2c′ of the guide bar.

The invention indicates that the arrangement 71 allotted said anchored support plate 7a and said displaceable clamping plate 7b in an active position clamps the inner end area 2d of the intermediately lying guide bar and is brought to an inactivable position wherein the clamping plate 7b and/or the end area 2d in a first mode of motion are displaced in a direction from the support plate 7a and in a second mode of motion said end area 2*d* and its guide bar 21 are displaced along the plane "P" allotted to the guide bar and out of the inactivated position of said arrangement 71.

Figure 8:
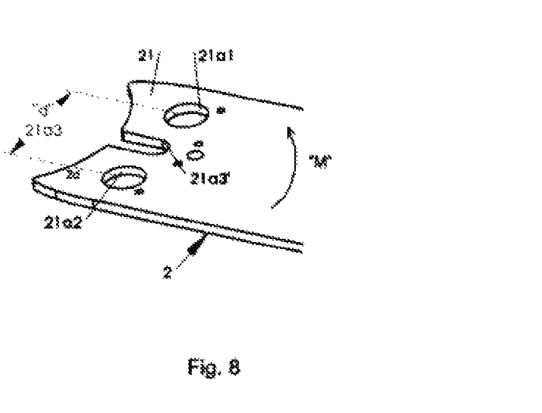
FIG. 8 shows in a perspective view the inner end portion of the guide bar provided with two peripheral circular recesses and an interrelated short slit.

The present invention is based on that the inner area may preferably be formed with one centrally oriented slit 21*a*3, FIG. 8, which has a total length dimension terminating in its innermost end area 21*a*3'. This slit may be oriented accross the support plate 7*a* and/or under the clamping plate 7*b*.

Furthermore, the inner area 2*d*, 2*d'* may have two "peripheral" recesses which may be facing and be covered by the support plate 7*a* and/or the displaceable clamping plate 7*b*.

The present invention suggests, in said inactivated position for the interrelated arrangement, unique modes of motions in order to displace the guide bar 21 from the chassis 1*a*, where said arrangement 71 and its clamping means 7*c* can be brought into an inactivated position and a stop position by releasing said clamping means 7*c* and during this inactivated position initially loosening or displacing said saw chain 5 from the guide bar 21 and its relinking disc 2*c* and in this position displacing said guide bar 21 and its drive motor unit facing end section or end area 2*d* along said plane "P" oriented through the side edges of the guide bar and out of said inactivated position for the arrangement, According to the invention the interrelated arrangement, primarily in the form of an arrangement 71 having a displaceable clamping plate 7*b* and a therein included anchored support plate 7*a* intended for clamping the guide bar is adapted to be displaced in an inactivated position of the arrangement 71 a short and well adapted by stopping means restricting distance from said support plate 7*a* exceeding a chosen thickness of guide bar 21, wherein the end portion 2*d* facing drive motor unit 1 of guide bar 21 initially in a first mode of motion is adapted to be able to be displaced in a first direction at a right angle from support plate 7*a* and the guide bar 21 and in a following second mode of motion is adapted to be able to be displaced along said plane "P" allotted to guide bar 21 and out of the inactivated arrangement 71.

A support plate 7*a* for the arrangement 71 properly anchored to chassis (1*a*) is, according the embodiment of FIG. 7, to be chosen to exhibit two short outwardly directed (sidewisely directed, upwardly directed or downwardly directed) projections or studs 7*a*1, 7*a*2, where each one is adapted for cooperation with peripheral or at a maximized distance from each other disposed recesses 21*a*1, 21*a*2 in FIG. 8 allotted for cooperation with the guide bar 21, and a clamping means 7*c* disposed between the projections, such as one with an allotted threading 7*c*'. It should be noted here that these projections 7*a*1, 7*a*2 or studs are to be shaped such that they can cooperate tightly (without clearance) with recesses 21*a*1, 21*a*2 for without sliding to hold the inner end area 2*d* of the guide bar between said anchored support plate 7*a* and said displaceable clamping plate 7*b*. Here primarily slanting coordinating surfaces are indicated.

In the activated position said displaceable clamping plate (7*b*), not shown In FIG. 7 but indicated, is adapted to urgently hold guide bar 21 against the upper surface of said support plate 7*a*.

Figure 9:
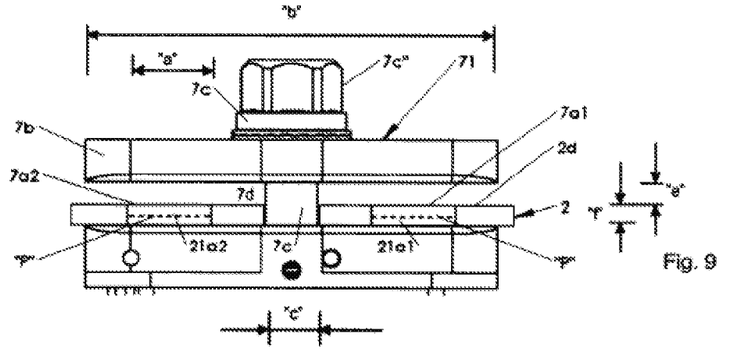
FIG. 9 shows a side view of an interrelated arrangement applicable in the embodiments according to FIGS. 7 and 8, respectively, in an inactivable position for an upper clamping plate and intended to illustrate a position for removing the guide bar from a support plate lying below the same and having two projections according to FIG. 7.
Figure 14:
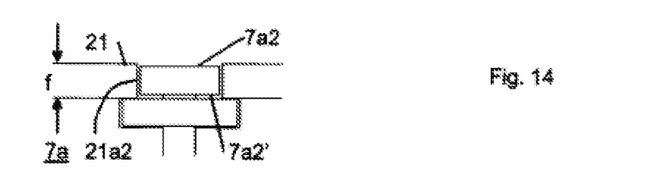
FIG. 14 shows partly in a section a proposed embodiment of a projection oriented within the inner area of the support plate and adapted to a support plate according to FIG. 7
Figure 15:
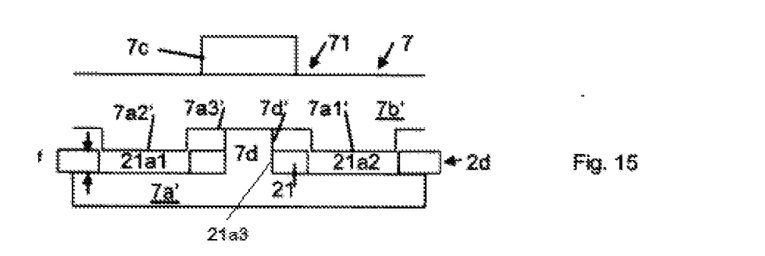
FIG. 15 illustrates an embodiment forming an alternative to the embodiment shown in FIG. 9 exposing two projections for the movable or displaceable clamping plate.

The short outwardly directed projections 7*a*1, 7*a*2 are allotted a height measurement corresponding to or at least somewhat smaller than the thickness "t" of guide bar 21, illustrated in FIGS. 9, 14 and 15.

The short outwardly directed projections 7*a*1, 7*a*2 of support plate 7*a* are allotted a circular (FIG. 7) and/or somewhat elliptical (FIG. 11) cross section and can be slightly conically shaped upwards (FIG. 7 and its enlarged cross section) so as to be able to distance free cooperate with recesses 21*a*1 and 21*a*2.

The cross section "a" or the diameter of one of said projections 7*a*2 (and 7*a*1) is chosen to 15 to 25%, such as around 20%, of the total length dimension "b" of support plate 7*a* crosswise with regard to the lengthwise direction 2' of the guide bar.

The clamping and together-linking or interrelating arrangement 71 has in FIG. 7 been chosen to have a rectangular cross section (a stylized rectangular prisma shape) having a bolt 7*c* with a threading 7*c*' and/or a nut 7*c*" having a diameter "c" of 10 to 20%, such as around 15%, of the length dimension "b" of support plate 7*a*.

A distance "d" between opposing circular and/or elliptical periphery surfaces of projections 7*a*1, 7*a*2 is adapted to 50 to 60% of the length dimension "b" of the support plate.

The along bolt 7*c* movably and displaceably disposed clamping plate (7*b*) is adapted to be able to move upwards a distance "e" from support plate 7*a* in FIG. 9 and the end area 2*d* resting thereon, which exceeds the thickness "t" of guide bar 21 by 80-100%.

FIG. 9 shows a position of the clamping arrangement 71 in a side view in which the support plate 7*a* loosely supports guide bar 21 and in which two holes 21*a*1, 21*a*2 in the peripheral area of the guide bar tightly cooperate with individual projections or raising studs 7*a*1, 7*a*2 and with a centrally disposed clamping means 7*c* which together with a loosened nut 7*c*" is located in its upper and inactive position.

Figure 10:
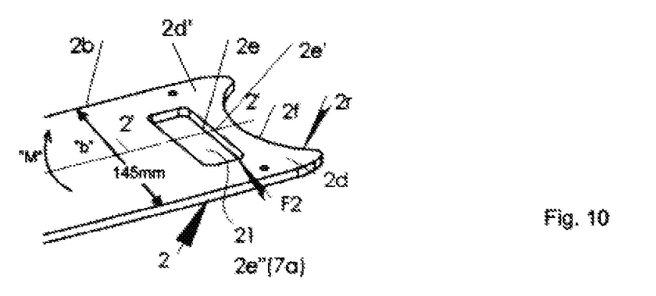
FIG. 10 shows a possible distribution of one of the materials within the inner end portion of the guide bar taking up the force distribution caused by a torque ("M") related to the outer end portion of the guide bar and in an activated clamping arrangement according to FIGS. 7 and 8, respectively.

FIG. 10 has the purpose of being able to illustrate the possible concentrations of force which can be considered to become active with in the rectangular recess 2*e* of the end area 2*d* cooperating with an introduced rectangular raising 2*e*" (not shown) in the support plate 7*a* and in an occurring pending or torque moment "M" the concentrations of forces are illustrated in the form of point loads and allotted the reference numerals F1 and F2.

Figure 11:
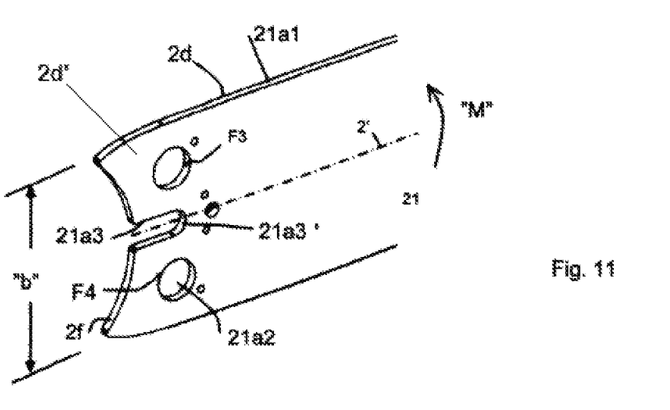
FIG. 11 illustrates equally as FIGS. 8 and 10 the force distribution caused by a torque ("M") within the outer end portion of the guide bar at an activated interrelated arrangement as seen in FIGS. 7 and 8.

In the same manner force concentrations F3 and F4 have been introduced around the recesses 21*a*1 and 21*a*2 in FIG. 11 at an occurring bending or torque moment "M".

Figure 12:
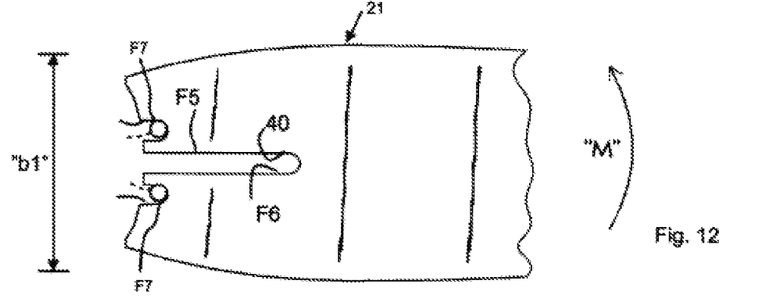
FIG. 12 shows a distribution of forces in material stresses in the inner end portion of a guide bar and an activated interrelated arrangement with a centered and elongated slit allotted to the guide bar according to the earlier known form (EP 0 993 767 B1) of the inner end area of the guide bar.

With regard to the known technology according to FIG. 12 the concentrations of forces F5 and F6 will become so great that they can create a tendency of a plastic deformation within said slot 40, a deformation which has shown to be very troubling and which as a rule requires the guide bar to be replaced by a standardized width dimension "b1".

FIG. 14 shows an embodiment of utilized projections 7*a*2 wherein this projection is shaped with a breakable area 7*a*2' being reduced in width and intended to be broken up with occurring strains of force within the guide bar 21 or holes 21*a*2 exceeding a predetermined value so as thereby to be able to avoid overloads and 10 deficiencies in the drive motor unit 1 and its surrounding equipment. That is, one or more projections are disposed with a braking or restricted area adapted to resist loads up to a maximum load of the projection. Also, the support plate (7*a*) and/or the clamping plate (7*b*) completely covers said recesses (21*a*1, 21*a*2) and an intermediately disposed slot (21*a*3).

FIG. 15 illustrates a tightening or interrelated arrangement 71' in which the clamping plate 7*b*' is provided with projections 7*a*1', 7*a*2' and an intermediately positioned recess 7*a*3' for thereby distributing developed tension forces from the clamping means 7*c* towards the projections 7*a*1', 7*a*2' and primarily towards the inner end area 2*d* of the guide bar adjacent to the recesses or holes 21*a*1 and 21*a*2. The reference designation 7*d* has the purpose of illustrating the existence of a resilient member or a means, such as a compression spring 7d' shaped to a screw line.

The invention is based on letting the end portion 2d of guide bar 21 according to FIG. 11 be as wide "b" as possible for distributing the recesses 21a1 and 21a2 from each other so that the edge portions can take up the forces "F3", "F4" which are created by the applied rotational, bending or torque movement "M". The chosen width dimension "b" will have practical consequences and can therefore not be chosen to all together big a size.

The present invention shows the existence of a spring means 7d' which is to be able to urge the clamping plate 7b' in a direction from the support plate 7a' in an inactivable position of the arrangement 7.

Within the frame of the invention falls also the construction of a guide bar 21 intended and adapted for i.a. being included in an arrangement 7 or 71.

The inner end portion 2d facing a clamping and linking or interrelated arrangement 71 is provided with at least one slit 21a3 for offering a displacement of the guide bar with regard to said arrangement 71, and where said slit 21a3 may be centrally oriented along said center line 2' disposed in the lengthwise extension of the guide bar.

The mentioned slit 21a3 is adapted to exhibit a lengthwise extension to an end area 21a3' from an edge line 2f of the guide bar and which is to extend centrally in the mentioned end portion 2d, such as at least somewhat smaller than the width dimension of said supporting plate 7a and said clamping plate 7b, and side relating the end area 21a3' for the mentioned slit 21a3 there exist two on individual sides of the slit and at the level of the mentioned end portion 2d for subtaking recesses 21a1, 21a2, which are dimensioned for taking up the forces which are to be referred to from a bending moment ("M") active on the outer end area 2c' of the guide bar.

This bending moment "M" is normally of short time duration but momentarily high and occurs when the guide bar 21 and its saw chain 5 are clamped or stuck in a cutting or a cut off while the guide bar 21 is being actuated for a rotational movement in its plane "P".

The invention is of course not limited to the embodiment mentioned above as an example and can be subjected to modifications within the frame of the invention contemplation illustrated in the following claims.

It should particularly be noted that each shown unit and/or circuit can be combined with each other shown unit and/or circuit within the frame of being able to achieve the desired technical function.

The invention claimed is:

1. A method for removing a guide bar (21) from a motor saw having a saw chain (5) guided by the guide bar (21), a drive motor unit (1), and a clamping plate (7b) clamping the guide bar (21) to a support plate (7a) fixedly attached to the motor saw,
    wherein the clamping plate (7b) clamps an inner end area (2d), facing the drive motor unit (1), of the guide bar (21) to the support plate (7a),
    the method for removing comprising the steps of:
        loosening, but not removing from the motor saw, the clamping plate (7b), such that the clamping plate remains interrelated with the support plate (7a),
        displacing the inner end area (2d) in a direction at right angles from a plane ("P") through the guide bar and at right angles from a support plate (7a), and
        displacing the inner end area (2d) and the guide bar (21) in a direction along said plane ("P") of the guide bar and out from the motor saw.

2. The method in accordance with claim 1, wherein the support plate (7a) is anchored relative to the drive motor unit (1) and is provided with two projections (7a1, 7a2) adapted for cooperation with peripheral recesses (21a1, 21a2) of the guide bar (21), and
    wherein a screw threading (7c') oriented between the projections is adapted to hold the guide bar (21) and the clamping plate (7b) against the support plate (7a) with a nut (7c),
    the step of loosening comprising loosening the nut (7c).

3. A motor saw comprising a guide bar (21) guiding a saw chain (5), a drive motor unit (1), a fixed support plate (7a) fixed relative to the motor unit (1), and a clamping plate (7b) adapted for clamping an inner end area (2d) of the guide bar (21) facing the drive motor unit (1) to the fixed support plate (7a) using a clamping means (7c) connected to the clamping plate (7b),
    wherein the clamping plate (7b) is adapted to be released from the inner end area (2d) by loosening the clamping means (7c) and displacing clamping plate (7b) at right angles a distance ("e") in a direction from the support plate (7a) at which distance ("e") the clamping plate (7b) still is connected to the clamping means (7c), and
    wherein the end area (2d) and guide bar (21) are adapted to be displaced along a plane ("P") of the guide bar and thereby disconnected from the motor saw, while the clamping plate (7a) remains connected to the clamping means (7c) wherein the fixed support plate (7a) fixed relative to the drive motor unit (1) is provided with two projections (7a1, 7a2), and each projection is adapted for cooperation with recesses (21a1, 21a2) provided in the inner end area (2d) of the guide bar (21), and wherein the clamping means comprises threading (7c') situated between the projections.

4. The motor saw in accordance with claim 3, wherein the two projections (7a1, 7a2) have a height from a surface of the fixed support plate (7a) shorter than a thickness dimension ("t") of the guide bar.

5. The motor saw in accordance with claim 4, wherein a distance ("d") between opposing periphery surfaces of the two projections is 50 to 60% of a length of the support plate.

6. The motor saw in accordance with claim 3, wherein the two projections (7a1, 7a2) of the support plate are each provided with at least one of a circular or elliptical cross section at an angle normal to an angle at which the projections project from the support plate (7a).

7. The motor saw in accordance with claim 6, wherein the cross section for at least one of the projections is 15 to 25% of a length dimension ("b") of the support plate (7a) crosswise to a length direction (2') of the guide bar.

8. The motor saw in accordance with claim 3, wherein the threading of the clamping means (7c) comprises a threaded projection from the support plate and is provided with a circular cross section at an angle normal to an angle at which the projections project from the support plate (7a), and
    wherein the threaded projection has a diameter of 10 to 20% of a length dimension ("b") of the support plate (7a).

9. The motor saw in accordance with claim 3, wherein the distance ("e") is 80-100% larger than a thickness of the guide bar.

10. The motor saw in accordance with claim 3, wherein at least one of the projections includes a breakable area (7a2') with reduced width, the breakable area adapted to be broken when loaded with a predetermined load.

11. The motor saw in accordance with claim 3, wherein the clamping plate (7b) includes a recess extending between the two projections (7a1, 7a2).

12. The motor saw in accordance with claim 3, wherein a spring unit (7d), when the clamping means (7c) is loosened, presses the clamping plate (7b) in a direction away from the support plate (7a).

13. The motor saw arrangement in accordance with claim 3, wherein at least one of the two projections have a shape successively reduced in cross section toward a projecting end of the projections, and the inner end area (2d) of the guide bar (21) exhibits at least one recess corresponding to the shape of the reduced cross section.

14. The motor saw arrangement according to claim 3, wherein the support plate (7a) and/or the clamping plate (7b) completely covers the recesses (21a1, 21a2) and an intermediately disposed slot (21a3).

15. The motor saw arrangement in accordance with claim 14, wherein the intermediately disposed slot (21a3) comprises an end portion (21a3') that extends to pass a line extending between central portions of the recesses.

16. The motor saw arrangement according to claim 3, wherein the inner end portion (2d) of the guide bar (21) facing a clamping arrangement (7) is provided with at least one slit (21a3) oriented along a center line (2') in the lengthwise extension of the guide bar, wherein said slit (21a3) extends lengthwise from an edge line (2f) of the guide bar, the edge line extending inside the inner end portion (2d), and there are two end areas for the slit (21a3), each on one side of the slit and each orientated adjacently the inner end portion (2d), and wherein the recesses (21a1, 21a2) are adapted to receive forces comprising a bending movement or torque ("M") active on an external end area (2c') of the guide bar.

* * * * *